US008153554B2

(12) United States Patent
Ritter et al.

(10) Patent No.: US 8,153,554 B2
(45) Date of Patent: Apr. 10, 2012

(54) REVERSIBLE HYDROGEN STORAGE MATERIALS

(75) Inventors: James A. Ritter, Lexington, SC (US); Tao Wang, Columbia, SC (US); Armin D. Ebner, Lexington, SC (US); Charles E. Holland, Cayce, SC (US)

(73) Assignee: University of South Carolina, Columbia, SC (US)

( * ) Notice: Subject to any disclaimer, the term of this patent is extended or adjusted under 35 U.S.C. 154(b) by 1181 days.

(21) Appl. No.: 11/940,651

(22) Filed: Nov. 15, 2007

(65) Prior Publication Data
US 2011/0218099 A1 Sep. 8, 2011

Related U.S. Application Data

(60) Provisional application No. 60/859,198, filed on Nov. 15, 2006, provisional application No. 60/920,731, filed on Mar. 29, 2007.

(51) Int. Cl.
*C01B 6/24* (2006.01)
*C01B 3/10* (2006.01)
*B01J 20/04* (2006.01)

(52) U.S. Cl. ..... 502/414; 420/900; 423/644; 423/648.1; 423/657

(58) Field of Classification Search ............... 423/644, 423/648.1, 657; 420/900; 206/0.7; 502/414
See application file for complete search history.

(56) References Cited

U.S. PATENT DOCUMENTS

| 4,193,978 A * | 3/1980 | Muller et al. ............ 423/648.1 |
| 4,396,589 A | 8/1983 | Bogdanovic |
| 4,466,870 A | 8/1984 | Boudjouk et al. |
| 5,886,229 A | 3/1999 | Corella et al. |
| 6,305,442 B1 | 10/2001 | Oushinsky et al. |
| 6,358,488 B1 | 3/2002 | Suda |
| 6,514,478 B2 * | 2/2003 | Zaluska et al. ............ 423/644 |
| 7,384,574 B2 | 6/2008 | Zidan et al. |
| 7,445,937 B2 | 11/2008 | Lemmon et al. |
| 2004/0009121 A1 * | 1/2004 | Jensen et al. ............ 423/648.1 |
| 2005/0106097 A1 | 5/2005 | Graham et al. |
| 2005/0191235 A1 * | 9/2005 | Vajo et al. ............ 423/657 |

FOREIGN PATENT DOCUMENTS

WO WO 2007002039 1/2007

OTHER PUBLICATIONS

Bogdanovic et al. :Ti-doped alkali metal aluminium hydrides as potential novel reversible hydrogen storage materials, 1997, Journal of alloys and compounds v253-254, p. 1-9.*

* cited by examiner

*Primary Examiner* — Stuart Hendrickson
*Assistant Examiner* — Syed Iqbal
(74) *Attorney, Agent, or Firm* — Dority & Manning, P.A.

(57) ABSTRACT

In accordance with the present disclosure, a process for synthesis of a complex hydride material for hydrogen storage is provided. The process includes mixing a borohydride with at least one additive agent and at least one catalyst and heating the mixture at a temperature of less than about 600° C. and a pressure of $H_2$ gas to form a complex hydride material. The complex hydride material comprises $MAl_xB_yH_z$, wherein M is an alkali metal or group IIA metal, Al is the element aluminum, x is any number from 0 to 1, B is the element boron, y is a number from 0 to 13, and z is a number from 4 to 57 with the additive agent and catalyst still being present. The complex hydride material is capable of cyclic dehydrogenation and rehydrogenation and has a hydrogen capacity of at least about 4 weight percent.

25 Claims, 3 Drawing Sheets

LiAlH$_2$(BH$_4$)$_2$     LiAlH$_3$(BH$_4$)

REVERSIBLE HYDROGEN STORAGE MATERIALS

CROSS REFERENCE TO RELATED APPLICATIONS

The present application is based on and claims priority to U.S. Provisional Application Ser. No. 60/859,198 having a filing date of Nov. 15, 2006 and U.S. Provisional Application Ser. No. 60/920,731 having a filing date of Mar. 29, 2007, which are both incorporated by reference herein.

GOVERNMENT SUPPORT CLAUSE

This disclosure was made with Government support under Contract No. DE-FC36-04GO14232 awarded by the United States Department of Energy. The Government has certain rights in the disclosure.

BACKGROUND

Recently, considerable attention has been given to the use of hydrogen as a fuel or fuel supplement. While the world's oil reserves are being rapidly depleted, the supply of hydrogen remains virtually unlimited. Hydrogen is a relatively low cost fuel and has the highest density of energy per unit weight of any chemical fuel. Furthermore, hydrogen is essentially non-polluting since the main by-product of burning hydrogen is water. However, while hydrogen has enormous potential as a fuel, a major drawback in its utilization, particularly in automotive applications, has been the lack of an acceptable on-board hydrogen storage medium.

Hydrogen storage in a solid matrix has become the focus of intense research because it is considered to be the only viable option for meeting performance targets set for such automotive applications. Although there are many technical targets and design criteria surrounding a viable hydrogen storage system, four important targets appear to be system volume and weight, discharging and charging rates, thermal management associated with charging, and dormant system overpressurization.

It is common for many materials to release copious amounts of heat during charging. In this regard, it is extremely difficult, if not impossible, to fill an on-board storage system with hydrogen in a short period of time because of inadequate thermal management unless a complicated heat exchanger system is integrated into the on-board filling operation. Such a problem can be resolved with off-board refilling of an easily exchangeable canister. It is also common for many materials to release hydrogen uncontrollably during minimal dormant heating. In this regard, it is very difficult, if not impossible, to prevent hydrogen from being vented to the environment to circumvent over-pressurization of the storage system during dormant heating unless a complex on-board "hydrogen on demand" type system is integrated into the on-board storage system. However, such a problem can be resolved with a material that only releases hydrogen at temperatures above some minimum level.

One of the more promising classes of hydrogen storage materials being studied is the complex hydrides, such as $NaAlH_4$. The dehydrogenation of $NaAlH_4$ is thermodynamically favorable, but it is kinetically slow and takes place at temperatures well above 200° C. The dehydrogenation temperature and the kinetics of dehydrogenation can be markedly improved by the addition of a dopant or co-dopants, such as titanium chloride. Graphitic structures, such as fullerenes, diverse graphites and even carbon nanotubes, can also play an important role in improving the kinetics of dehydrogenation and reversibility of certain complex metal hydrides. Rehydrogenation of the $NaAlH_4$ system is typically carried out at greater than 100° C. and greater than 1,000 psig to achieve reasonable kinetics and conversions. While the $NaAlH_4$ system is attractive for hydrogen storage because it contains a relatively high concentration of useful hydrogen, its modest weight percent of hydrogen storage capacity is a major drawback toward commercial vehicular applications.

Other complex hydrides, such as $LiAlH_4$, have much better hydrogen storage capacities. However, some complex hydrides, including $LiAlH_4$, do not exhibit any reversibility under conditions that cause the $NaAlH_4$ system to easily rehydrogenate. Good reversibility and fast kinetics are both needed to enable hydrogen storage materials to be capable of repeated absorption-desorption cycles without significant loss of hydrogen storage capacity and at reasonable charge and discharge rates.

Therefore, a need exists to develop materials and methods for reversible hydrogen storage in complex hydrides. Transportation and stationary applications may become more feasible when such approaches are utilized in the development of reversible hydrogen storage materials.

BRIEF DESCRIPTION OF THE DRAWINGS

A full and enabling disclosure of the present disclosure, including the best mode thereof to one of ordinary skill in the art, is set forth more particularly in the specification, including reference to the accompanying Figures in which.

SUMMARY

Figure 1:
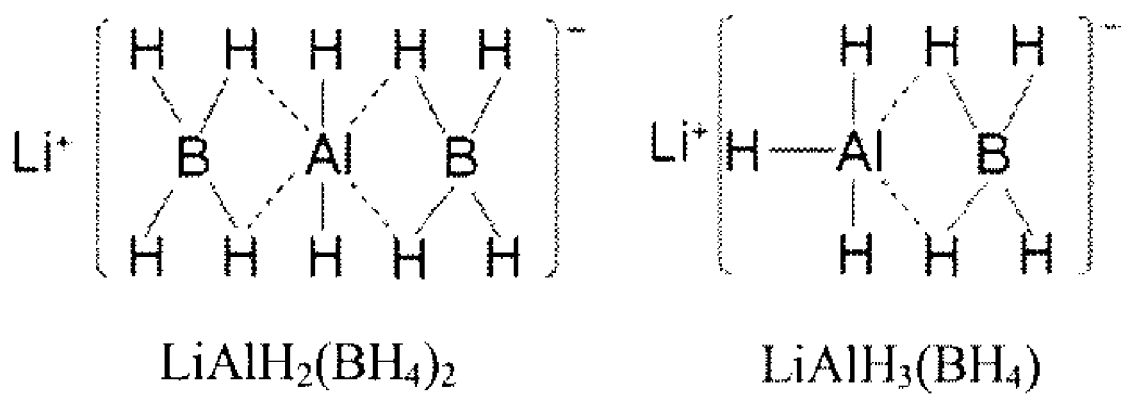
FIG. 1 depicts triple metal complex hydride structures in accordance with certain embodiments of the present disclosure.

The present disclosure recognizes and addresses the foregoing needs as well as others.

In accordance with the present disclosure, a process for synthesis of a complex hydride material for hydrogen storage is provided. The process includes mixing a borohydride with at least one additive agent and at least one catalyst and heating the mixture at a temperature of less than about 600° C. and a pressure of $H_2$ gas to form a complex hydride material. The complex hydride material comprises $MAl_xB_yH_z$, wherein M is an alkali metal or group IIA metal, Al is the element aluminum, x is any number from 0 to 1, B is the element boron, y is a number from 0 to 13, and z is a number from 4 to 57 with the additive agent and catalyst still being present. The complex hydride material is capable of cyclic dehydrogenation and rehydrogenation and has a hydrogen capacity of at least about 4 weight percent.

In certain embodiments, the borohydride may comprise $LiBH_4$, $NaBH_4$, $Mg(BH_4)_2$, $Be(BH_4)_2$, $KBH_4$, $Al(BH_4)_3$, or combinations thereof. The additive agent or catalyst may comprise an alkali hydride, aluminum, aluminum hydride, complex aluminum hydride, transition metal, transition metal compound, metal hydride, carbon material or combinations thereof. The additive agent may comprise Al powder, $AlH_3$, $NaAlH_4$, $LiAlH_4$, $KAlH_4$, $Mg(AlH_4)_2$, $Be(AlH_4)_2$, $Ca(AlH_4)_2$, $Fe(AlH_4)_2$, $Mn(AlH_4)_2$, $Ti(AlH_4)_3$, $Ti(AlH_4)_4$, $Sn(AlH_4)_4$, $Zr(AlH_4)_4$ or combinations thereof. The catalyst may comprise Sc, Ti, V, Mn, Fe, Co, Ni, Cu, Zn, Zr, Pd, Pt, Ru, Rh, or combinations thereof. The catalyst may comprise graphite, carbon nanostructures, carbon nanotubes, carbon nanohorns, carbon nanofibers, activated carbon, allotropes of carbon, or combinations thereof. The mixture may be heated to a temperature of less than about 500° C. The complex hydride material may have a hydrogen capacity of at least about 7 weight percent, more particularly at least about 10 weight percent, more particularly at least about 15 weight percent. The inert gas may comprise argon.

The process may further comprise dehydrogenating and rehydrogenating the complex hydride material, the complex hydride material being rehydrogenated in the presence of $H_2$. The rehydrogenation may occur at a pressure of less than about 150 bar of $H_2$. The rehydrogenated complex hydride material may have a hydrogen capacity of at least about 4 weight percent. The rehydrogenated complex hydride material may have a hydrogen capacity of at least about 7 weight percent. The rehydrogenated complex hydride material may have a hydrogen capacity of at least about 10 weight percent. The complex hydride material may be rehydrogenated at a temperature of less than about 500° C., more particularly less than about 400° C., more particularly less than about 300° C.

In another embodiment of the present disclosure, a complex hydride material for cyclic dehydrogenation and rehydrogenation is provided. The material comprises $MAl_xB_yH_z$ wherein M is an alkali metal or group IIA metal, Al is the element aluminum, x is any number from 0 to 1, B is the element boron, y is a number from 0 to 13, and z is a number from 4 to 57 with at least one additive agent and at least one catalyst being present. The complex hydride material has a hydrogen capacity of at least about 4 weight percent and is capable of hydrogenation at temperatures of less than about 400° C.

In certain embodiments, hydrogenation may be capable of occurring at a temperature of less that about 500° C. Hydrogenation may be capable of occurring at less than about 150 bar of $H_2$. The hydrogen capacity may be at least about 7 weight percent. The additive agent may comprise Al powder, $AlH_3$, $NaAlH_4$, $LiAlH_4$, $KAlH_4$, $Mg(AlH_4)_2$, $Be(AlH_4)_2$, $Ca(AlH_4)_2$, $Fe(AlH_4)_2$, $Mn(AlH_4)_2$, $Ti(AlH_4)_3$, $Ti(AlH_4)_4$, $Sn(AlH_4)_4$, $Zr(AlH_4)_4$ or combinations thereof. The catalyst may comprise graphite, carbon nanostructures, carbon nanotubes, carbon nanohorns, carbon nanofibers, activated carbon, allotropes of carbon, or combinations thereof.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure, which broader aspects are embodied in the exemplary construction.

In general, the present disclosure is directed to a new class of high temperature hydrogen storage materials that meet some of the challenges presented by on-board hydrogen storage systems. In particular, the present disclosure is directed to a novel thermal hydrogenation approach that uses high temperature, in conjunction with one or more additive agents, and a hydrogen atmosphere to foster reversibility in novel complex hydrides, such as Li, Al and/or B complex hydrides.

As disclosed and described in PCT/US2006/023914 (the content of which is incorporated by reference herein), a physiochemical pathway to reversible hydrogen storage in complex hydrides was developed. The physiochemical pathway approach uses a liquid complexing agent, one or more catalysts, and a hydrogen atmosphere to foster reversibility in a wide variety of hydrogen storage materials, beyond complex hydrides. The physiochemical route described can lower the temperatures and pressures required for reversibility of materials that are regenerable by more conventional methods. The physiochemical route described can also lower the temperatures and pressures required for the synthesis of complex hydride materials. More particularly, the physiochemical route described enables regeneration or synthesis of complex hydride material through the utilization of a complex-forming solvent which is amenable to fostering reversibility of high hydrogen capacity complex hydrides or lowering the temperatures and pressures for synthesis. As used herein, regeneration refers to replacement of hydrogen that has been previously liberated from the complex hydride material. As used herein, synthesis refers to the formation of a complex hydride material from metals and metal hydrides of similar composition to the complex hydride.

The physiochemical route has been found to foster the reversibility of $LiAlH_4$ with reasonable rates at ambient temperature and low pressures of about 3-60 bar. Such results are particularly notable when considering that $LiAlH_4$ needs a pressure exceeding 1000 bar to rehydrogenate it from LiH and Al simply by exposure to hydrogen.

The physiochemical route or a variation thereof has been applied to some other complex hydrides, including $NaAlH_4$ and a new class of complex hydride hydrogen storage materials based on Li, Al and/or B chemistry that exhibit a reversible hydrogen storage capacity of about 3 to about 13 wt % or higher. $NaAlH_4$ can now be regenerated at ambient temperature and in the same pressure range as $LiAlH_4$; and this new class of high capacity complex hydride hydrogen storage materials currently releases about 13 wt % hydrogen in the 180 to 350° C. range with rehydrogenation taking place in the 80° to 150° C. range using about 90 bar or less of hydrogen.

For the physiochemical pathway, a liquid complexing agent, one or more catalysts, and a hydrogen atmosphere synergistically foster reversibility in a new class of Li, Al and B complex hydrides, the ratio of the Al to B species likely controls the amount of hydrogen released, and the rates of charge and discharge are likely controlled by the dehydrogenation and hydrogenation temperatures, hydrogenation pressure, type and amount of additive agent(s) or catalyst(s), and type and amount of complexing agent.

The present disclosure is directed to a novel thermal hydrogenation approach that fosters the reversibility of complex hydrides. The temperature for such reversibility can be from about 100° C. to about 2000° C. and the pressure can range from about 1 bar to about 150 bar or higher of hydrogen. Such conditions provide for favorable reaction results. A unique feature of this thermal hydrogenation approach is that the liquid complex agent associated with the physiochemical pathway described previously is replaced with higher temperatures. The thermal hydrogenation approach with Li, Al and/or B complex hydride systems exhibit reversibility at reasonable engineering conditions. For the thermal hydrogenation approach, temperature, one or more additive agent(s) and/or catalyst(s), and a hydrogen atmosphere synergistically foster reversibility in this new class of Li, Al and B complex hydrides. In this regard, the ratio of the Al to B species is thought to control the amount of hydrogen released. The rates of charge and discharge are controlled by the dehydrogenation and hydrogenation temperatures, hydrogenation pressure, and type and amount of additive agent(s) and/or catalysts. In certain embodiments of the thermal hydrogenation approach, one or more additive agent(s) and/or catalyst(s) can also be added to the process.

The present disclosure is also directed to a new class of complex hydride materials. The new material comprises the general formula $MAl_xB_yH_z$ wherein M is an alkali metal or group IIA metal; Al is the element aluminum; x is from 0 to 1; B is the element boron; y is from 0 to 13; and z is from 4 to 57. The new material also includes at least one additive agent and at least one catalyst. In certain embodiments, the formation of an Al and B alloy occurs during dehydrogenation at high temperature, followed by a triple metal complex hydride being produced during hydrogenation due to the existence of lithium hydride. Two plausible triple metal complex hydride structures are shown in FIG. 1. It is further contemplated that the reactions described herein will form the following new class of Li, Al and/or B complex hydride materials that react as shown below:

LiAlH$_3$(BH$_4$)↔LiH+Al—B+3H$_2$ (11.6 wt %)

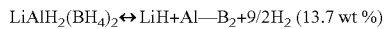
LiAlH$_2$(BH$_4$)$_2$↔LiH+Al—B$_2$+9/2H$_2$ (13.7 wt %)

LiAlH(BH$_4$)$_3$↔LiH+Al—B$_3$+6H$_2$ (15.1 wt %)

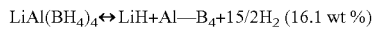
LiAl(BH$_4$)$_4$↔LiH+Al—B$_4$+15/2H$_2$ (16.1 wt %)

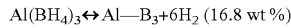
Al(BH$_4$)$_3$↔Al—B$_3$+6H$_2$ (16.8 wt %)

Al has previously been introduced as an additive to lower the hydrogenation temperature of LiBH$_4$. A change in the Al to LiBH$_4$ ratio not only decreased the hydrogenation temperature, but it also increased the hydrogen storage capacity, even beyond that theoretically possible based just on LiBH$_4$. This result indicates that a different complex hydride is formed during the high temperature reactions. Depending on the Al to LiBH$_4$ ratio, it has been previously reported in U.S. Pat. No. 4,193,978 that reversible hydrogen capacities were as high as 15 wt %, with hydrogenation taking place at 650° C. and 150 bar of hydrogen over 12 hours and dehydrogenation taking place at 416° C. for 10 hrs. However, at 385° C. and 80 bar of hydrogen, hydrogenation barely occurred, as the previous experiments achieved only 1.5 wt % hydrogen in 0.5 hour with the claim of a very slow reaction at these relatively low temperatures and pressures.

To further substantiate the proposed triple metal complex hydride structures, the experimental reversible hydrogen storage capacities reported previously for various ratios of Al to LiBH$_4$ are compared to the corresponding theoretical structures and capacities in Table 1. The results in the table are based on the reaction stoichiometry given in the reactions above, and that the dehydrogenated state has LiH and metals of Al and B, as described above. The predicted capacities appear to correspond with the experimental capacities.

From the comparison provided herein it appears that TiCl$_3$ and multi-walled carbon nanotubes behave as very effective catalysts for the Li, Al, and B triple metal complex hydride system. The preliminary results obtained reveal that these catalysts lower both the dehydrogenation and hydrogenation temperatures and the hydrogenation pressure considerably. The present disclosure describes that a high temperature, reversible hydrogen storage material comprised of a catalyzed Li, Al and B complex hydride exhibits a very high hydrogen capacity, potentially exceeding 15 wt %.

The advantages of the present disclosure may be better understood with reference to the following example.

EXAMPLE

Example

Figure 2:
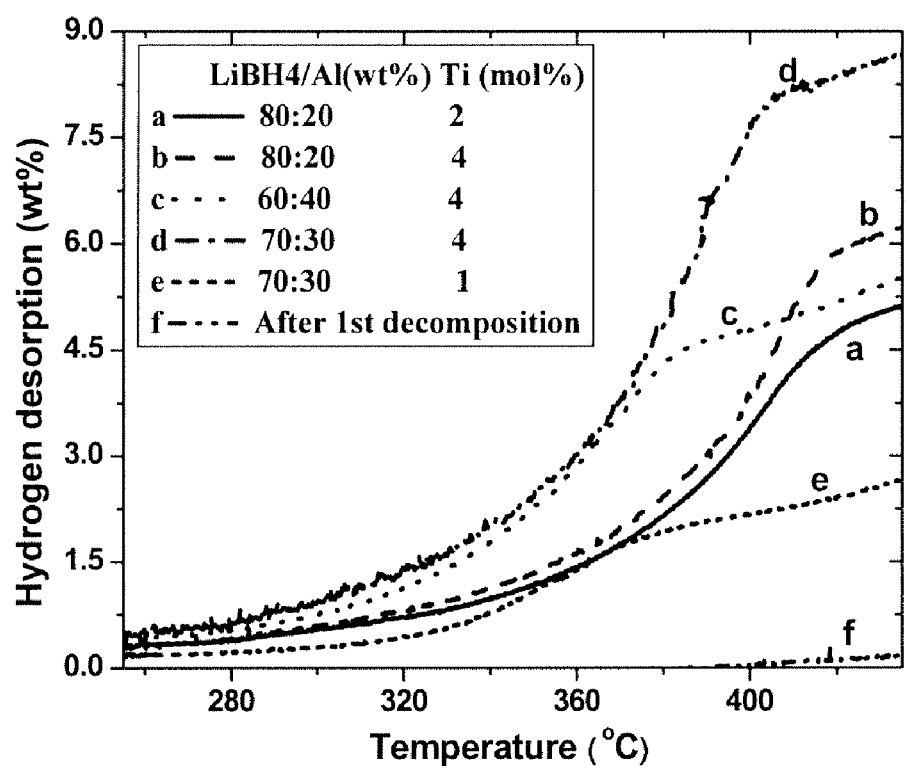
FIGS. 2-3 show graphs further discussed in the Examples included herewith.
Figure 3:
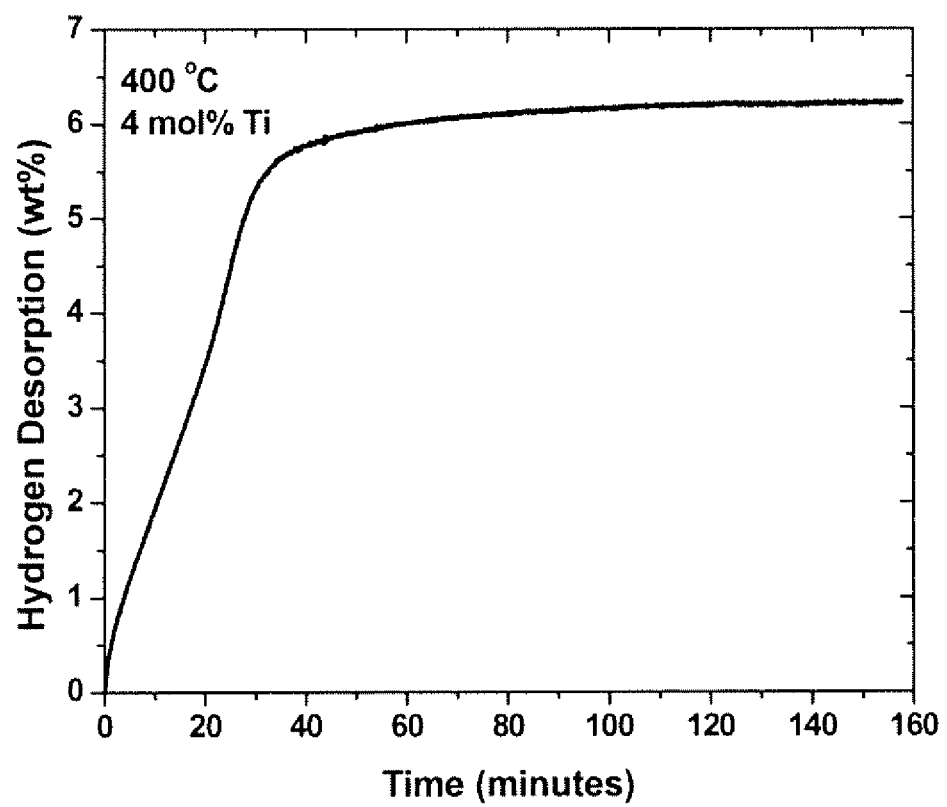

Thermal Hydrogenation Approach: Reversibility in Li, Al and/or B Complex Hydrides A thermal hydrogenation approach has also been developed for the new class of complex hydrides based on Li, Al and B chemistry. The temperature programmed desorption (TPD) results in FIG. 2 were obtained by ball milling TiCl$_3$, multi-walled carbon nanotubes, LiBH$_4$ and Al for 50 to 120 minutes at room temperature using a SPEX 8000 high-energy ball mill. The samples were then completely decomposed for several hours in a tube furnace at 400° C. in the presence of an inert gas. Curve f is a typical TPD curve of the decomposed material. Samples of this material were then hydrogenated for 3 hr in a reactor at temperatures between 305° and 340° C. under 100 bar of hydrogen using the thermal hydrogenation approach. Depending on the ratio of LiBH$_4$ to Al ratio (as shown by curves b, c and d in FIG. 3), and depending on the amount of Ti catalyst (curves a and b, or curves d and e), these materials could be discharged with reasonable rates in the 250° to 400° C. range and released up to 8 wt % hydrogen. It is noteworthy that these experiments were carried out both gravimetrically and volumetrically, with the volumetric results showing similar uptakes of hydrogen during hydrogenation as the gravimetric results showed during dehydrogenation. The constant temperature desorption curve shown in FIG. 3 was obtained from the same sample as TPD curve b in FIG. 2. These results show that reasonable dehydrogenation rates can also be obtained with Li, Al and B based complex hydride materials when doped and processed as described above. Similar hydrogenation rates were observed from the volumetric system.

The approaches to developing reversible hydrogen storage materials proposed herein, in conjunction with the complex hydride system, address the disadvantages of current construction and methods and provide attractive alternatives for high capacity on-board hydrogen storage with a rapid and safe refueling time, since rehydrogenation can take place off-board but still within the storage vessel at the filling station with a reasonable turn-around time and cost.

In some embodiments, the hydrogen storage material described herein can be incorporated into a fuel cartridge. In some embodiments, such a fuel cartridge could be used in connection with an internal combustion engine. In other embodiments, the fuel cartridge could be utilized in other automotive applications, e.g., with a fuel cell.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the disclosure so further described in such appended claims.

TABLE 1

| Composition (wt %) | | New Theoretical Structures | Theoretical Capacity (wt %) | Muller's Experimental Results (wt %) |
|---|---|---|---|---|
| $LiBH_4$ | Al | after 1st Charge | | |
| 90 | 10 | $LiAl(BH_4)_4$ & $LiBH_4$ | 13.5 | 15 |
| 80 | 20 | $LiAl(BH_4)_4$ & $LiBH_4$ | 13.3 | 14 |
| 70 | 30 | $LiAlH(BH_4)_3$ & $LiAlH_2(BH_4)_2$ | 13 | 12.5 |
| 60 | 40 | $LiAlH_2(BH_4)_2$ & $LiAlH_3(BH_4)$ | 12.7 | 11.4 |

What is claimed:

1. A process for synthesis of a complex hydride material for hydrogen storage comprising:
  mixing a borohydride with at least one additive agent and at least one catalyst; and
  heating the mixture at a temperature of less than about 600° C. in the presence of an inert gas to form a complex hydride material comprising $MAl_xB_yH_z$, wherein M is an alkali metal or group IIA metal, Al is the element aluminum, x is any number from 0 to 1, B is the element boron, y is a number from 0 to 13, and z is a number from 4 to 57, the additive agent and the catalyst still being present;
  wherein the complex hydride material is capable of cyclic dehydrogenation and rehydrogenation and has a hydrogen capacity of at least about 4 weight percent.

2. A process as in claim 1, wherein the borohydride comprises $LiBH_4$, $NaBH_4$, $Mg(BH_4)_2$, $Be(BH_4)_2$, $KBH_4$, $Al(BH_4)_3$, or combinations thereof.

3. A process as in claim 1, wherein the additive agent or catalyst comprises an alkali hydride, aluminum, aluminum hydride, complex aluminum hydride, transition metal, transition metal compound, metal hydride, carbon material or combinations thereof.

4. A process as in claim 1, wherein the additive agent comprises Al powder, $AlH_3$, $NaAlH_4$, $LiAlH_4$, $KAlH_4$, $Mg(AlH_4)_2$, $Be(AlH_4)_2$, $Ca(AlH_4)_2$, $Fe(AlH_4)_2$, $Mn(AlH_4)_2$, $Ti(AlH_4)_3$, $Ti(AlH_4)_4$, $Sn(AlH_4)_4$, $Zr(AlH_4)_4$ or combinations thereof.

5. A process as in claim 1, wherein the catalyst comprises Sc, Ti, V, Mn, Fe, Co, Ni, Cu, Zn, Zr, Pd, Pt, Ru, Rh, or combinations thereof.

6. A process as in claim 1, wherein the catalyst comprises graphite, carbon nanostructures, carbon nanotubes, carbon nanohorns, carbon nanofibers, activated carbon, allotropes of carbon, or combinations thereof.

7. A process as in claim 1, wherein the mixture is heated to a temperature of less than about 500° C.

8. A process as in claim 1, wherein the complex hydride material has a hydrogen capacity of at least about 7 weight percent.

9. A process as in claim 1, wherein the complex hydride material has a hydrogen capacity of at least about 10 weight percent.

10. A process as in claim 1, wherein the complex hydride material has a hydrogen capacity of at least about 15 weight percent.

11. A process as in claim 1, wherein the inert gas comprises argon.

12. A process as in claim 1, further comprising dehydrogenating and rehydrogenating the complex hydride material, the complex hydride material being rehydrogenated in the presence of $H_2$.

13. A process as in claim 12, wherein rehydrogenation occurs at a pressure of less than about 150 bar of $H_2$.

14. A process as in claim 12, wherein the rehydrogenated complex hydride material has a hydrogen capacity of at least about 4 weight percent.

15. A process as in claim 12, wherein the rehydrogenated complex hydride material has a hydrogen capacity of at least about 7 weight percent.

16. A process as in claim 12, wherein the rehydrogenated complex hydride material has a hydrogen capacity of at least about 10 weight percent.

17. A process as in claim 12, wherein the complex hydride material is rehydrogenated at a temperature of less than about 500° C.

18. A process as in claim 12, wherein the complex hydride material is rehydrogenated at a temperature of less than about 400° C.

19. A process as in claim 12, wherein the complex hydride material is rehydrogenated at a temperature of less than about 300° C.

20. A complex hydride material for cyclic dehydrogenation and rehydrogenation comprising:
  $MAl_xB_yH_z$ wherein M is an alkali metal or group IIA metal, Al is the element aluminum, x is any number from 0 to 1, B is the element boron, y is a number from 0 to 13, and z is a number from 4 to 57 with at least one additive agent and at least one catalyst being present, such complex hydride material having a hydrogen capacity of at least about 4 weight percent and being capable of hydrogenation at temperatures of less than about 600° C.

21. A complex hydride material as in claim 20, wherein hydrogenation is capable of occurring at a temperature of less that about 500° C.

22. A complex hydride material as in claim 20, wherein hydrogenation is capable of occurring at less than about 150 bar of $H_2$.

23. A complex hydride material as in claim 20, wherein the hydrogen capacity is at least about 7 weight percent.

24. A complex hydride material as in claim 20, wherein the additive agent comprises Al powder, $AlH_3$, $NaAlH_4$, $LiAlH_4$, $KAlH_4$, $Mg(AlH_4)_2$, $Be(AlH_4)_2$, $Ca(AlH_4)_2$, $Fe(AlH_4)_2$, $Mn(AlH_4)_2$, $Ti(AlH_4)_3$, $Ti(AlH_4)_4$, $Sn(AlH_4)_4$, $Zr(AlH_4)_4$ or combinations thereof.

25. A complex hydride material as in claim 20, wherein the catalyst comprises graphite, carbon nanostructures, carbon nanotubes, carbon nanohorns, carbon nanofibers, activated carbon, allotropes of carbon, or combinations thereof.

* * * * *